United States Patent
Baddaria

[11] Patent Number: 5,984,815
[45] Date of Patent: Nov. 16, 1999

[54] SPRING BLADE TENSIONER WITH CURVED BLADE ENDS

[75] Inventor: Giuseppe Baddaria, Robbiate, Italy

[73] Assignee: Morse TEC Europe S.p.A., Italy

[21] Appl. No.: 09/012,124

[22] Filed: Jan. 22, 1998

[51] Int. Cl.[6] ............................... F16H 7/08; F16H 7/18
[52] U.S. Cl. ............................................ 474/111; 474/140
[58] Field of Search .................................... 474/101, 109, 474/111, 140, 133, 135, 138

[56] References Cited

U.S. PATENT DOCUMENTS

| | | | |
|---|---|---|---|
| 3,276,282 | 10/1966 | Duncan | 74/242.11 |
| 3,463,025 | 8/1969 | Turner et al. | 74/242.11 |
| 3,490,302 | 1/1970 | Turner et al. | 74/242.11 |
| 4,921,472 | 5/1990 | Young | 474/111 |
| 5,055,088 | 10/1991 | Cradduck et al. | 474/111 |
| 5,266,066 | 11/1993 | White | 474/111 |
| 5,286,234 | 2/1994 | Young | 474/111 |
| 5,425,680 | 6/1995 | Young | 474/111 |
| 5,462,493 | 10/1995 | Simpson | 474/111 |
| 5,662,540 | 9/1997 | Schnuepke et al. | 474/111 |
| 5,797,818 | 8/1998 | Young | 474/111 |
| 5,853,341 | 12/1998 | Wigsten | 474/140 |

FOREIGN PATENT DOCUMENTS

| | | |
|---|---|---|
| 57-134054 | 8/1982 | Japan . |
| 57-134055 | 8/1982 | Japan . |
| 907983 | 10/1962 | United Kingdom . |

*Primary Examiner*—Tamara L. Graysay
*Assistant Examiner*—Matthew A. Kaness
*Attorney, Agent, or Firm*—Sidley & Austin; Greg Dziegielewski

[57] ABSTRACT

A tensioner for a chain drive (10) having a shoe (12) made of wear-resistant thermoplastic material and one or more flat spring blades (15) with the ends contained in pockets (13a, 14a) provided in the enlarged ends of the shoe. The ends of the flat spring blade or blades (15) are slightly curved with the convexity turned toward the same side on which the spring presents a concavity, to prevent these ends, as they wear, from creating a groove in the surface of the plastic material of the shoe pocket and blocking the free flow of the ends of the spring in the pockets.

4 Claims, 2 Drawing Sheets

SPRING BLADE TENSIONER WITH CURVED BLADE ENDS

BACKGROUND OF THE INVENTION

This invention pertains to the field of chain tensioners, particularly but not exclusively in the automotive field.

In a chain drive, the transmission chain, for example, a chain with rollers, inverted teeth, or another type, is wrapped around a driving sprocket and a driven sprocket. Movement of the stretched or tight strand of the chain is generally controlled by a fixed straight tensioner arm or snubber, while the slack portion of the chain utilizes an adjustable tensioning device to prevent excessive slack in the chain and maintain the path of the chain as it passes around the driving sprocket and over the driven sprocket.

The automobile industry has long been concerned with better tensioning devices. A currently preferred type includes a blade tensioner with a shoe made of plastic material connected to one or more flat springs. The blade tensioner operates by allowing the chain to run across the plastic shoe. The spring blades that are inserted within the shoe cause the shoe to deform to a more arcuate shape as the shoe is heated from the contact of the chain being driven across its surface.

U.S. Pat. No. 5,055,088 discloses such a blade tensioner in which two blade springs are mechanically interlocked within a shoe. U.S. Pat. No. 4,921,472 discloses a blade tensioner in which the plastic shoe is made of rigid heat stabilized nylon. U.S. Pat. No. 5,462,493 discloses a blade type tensioner in which two shoes overlap one or more spring blades.

A conventional blade tensioner of the prior art is illustrated in FIGS. 2, 3, and 4. The shoe element 2 of the tensioner 1 is typically made of thermoplastic material and includes an expanded head or knurl 3 at one end and an expanded head or knurl 4 at the other end. The expanded head 3 and the expanded head 4 have blind pockets 3a and 4a. A group of flat springs, for example, three in the tensioner of FIG. 3, and two in the tensioner of FIG. 4, are connected to the shoe and are indicated as reference 5. The flat springs are shaped substantially as elongated rectangles, with a length slightly less than the distance between the ends of the pockets 3a, 4a. Laterally, the flat springs are contained by lateral containment walls 7; 3b and 4b correspond to heads 3 and 4, and on the opposite side by teeth 6. The head 4 has an aperture 4c to receive a pin (not shown) on which the tensioner 1 is mounted and permitted to move in an arcuate manner.

The tensioner is assembled by inserting the group of flat springs 5, which in the absence of stress have a U-shape, within the shoe 2, which in the absence of stress has an extended or planar shape. Therefore, the group of springs 5 is mounted within the ends of the channels 3a and 4a, and the assembly takes on the shape illustrated in FIGS. 2 and 3. When the tensioner is exposed to heating, which occurs, for example, when it is mounted in the engine of an automobile and the engine is being operated, the plastic material of the shoe deforms additionally and the stretched plastic of the shoe takes on a more curved or arcuate shape, depending on the length of the slack side of the chain. Cyclic variations in the transmitted torque, which are characteristic of the engine in use, can cause continuous variations in the radius of the shoe, resulting in sliding of the springs from the ends between the respective pockets.

One example of the application of a tensioner of the prior art with a shoe is illustrated in FIG. 1, in which the tensioner is indicated at 1, the chain at C, and the sprockets as R1 and R2. R2 is the driving sprocket and R1 is the driven sprocket. The upper side of the chain is the tight strand or side and the lower side is the slack side.

In the prior art, the flat springs 5, as shown best in FIG. 4, have their ends aligned and coplanar with the rest of the body of the blade, or curved in conformance to the concavity of the tensioner shoe. This creates the disadvantage that, after a relatively prolonged working session or after a certain number of cycles of contraction and stretching, the end of the spring, or the group of flat springs, may form a groove in the walls of the pocket of the shoe such as 4a, as indicated with the dotted line 4d. This groove 4d forms a trap for the end of the spring, which impedes its sliding along the pocket 4a and in practice blocks and impedes the tensioner's ability to function optimally.

The purpose of the present invention is to eliminate the disadvantage discussed above of blockage of the ends of the springs in the pockets.

SUMMARY OF THE INVENTION

In one embodiment, the novel chain tensioner of the present invention include a shoe element of plastic material having heads or knurls with expanded ends and housing pockets. The tensioner is assembled so that the shoe exerts a force on the spring which tends to stretch the spring and the spring exerts a force on the shoe that tends to force or curve the shoe inward. The ends of the spring blades or the group of spring blades contained in the pockets of the shoe heads have a curved or rounded shape at the end of the blade that is supported on the surface of the pocket.

The use of curved ends on the blades of the present invention prolongs the lifespan of the chain tensioner and improves its operation.

BRIEF DESCRIPTION OF THE DRAWINGS

One preferred embodiment of the invention will be described below only as a non-limiting example with reference to the attached drawings, in which.

DETAILED DESCRIPTION OF THE PREFERRED EMBODIMENTS

Figure 1:
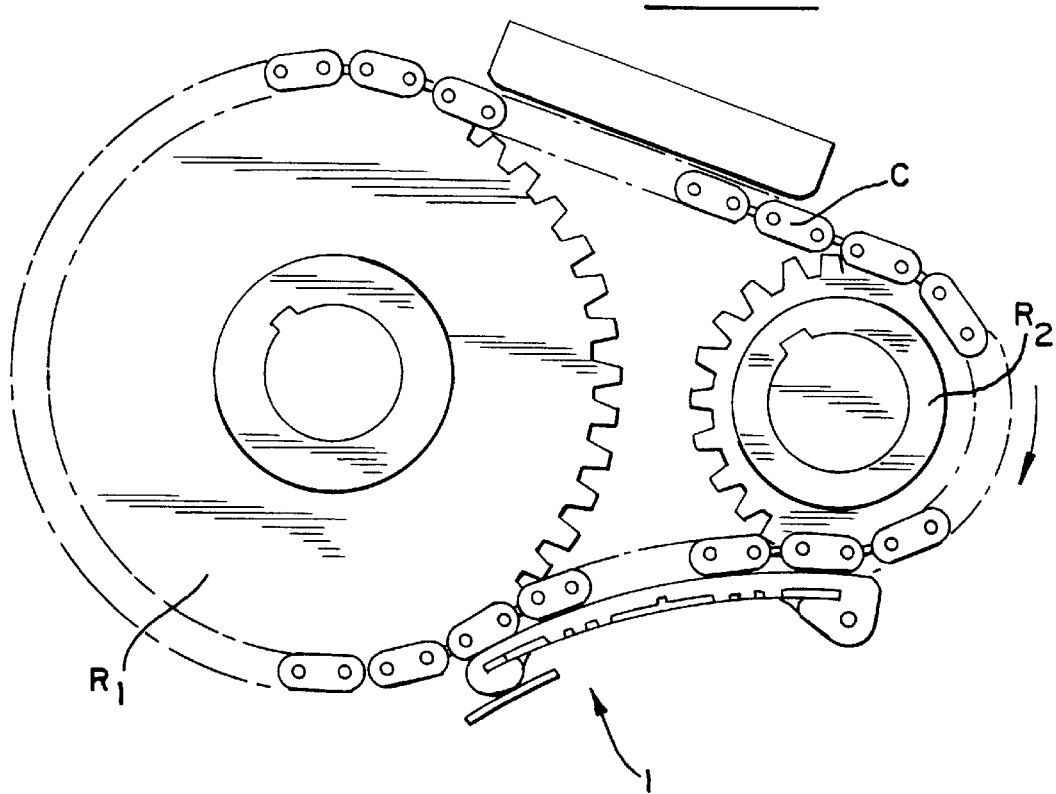
FIG. 1 is a schematic illustration of the operation of a chain tensioner of the prior art having a shoe and flat spring.

As mentioned briefly, a chain tensioner 1 of the prior art is shown in FIG. 1. The tensioner 1 is of the shoe and flat spring type and includes a shoe element 2 made of plastic material, such as nylon, which is subject to deformation. The tensioner also includes a flat spring 5, or a group of flat springs made of spring steel. The spring or group of springs are held inside the shoe with the ends of the springs contained in pockets 3a, 4a created at the heads of expanded ends 3, 4 of the shoe. Under non-deformed or non-operative conditions, the shoe is stretched or planar and the springs have a U-shape. When in use in the tensioner against a chain drive, the springs exert a force on the shoe which tends to force the ends of the shoe inward toward one another in an arcuate shape. The shoe also exerts a force on the springs which tends to stretch the springs into a straight condition. The curvature which the springs impart to the shoe increases with time and with the heat that increases as the tensioner is subjected to a chain being driven across the upper surface of the shoe. The heat from the frictional contact of the chain with the shoe makes the shoe more flexible, allowing an automatic regulation of the chain's tension as a function of the transmitted torque. The shoe deformation follows the elongation of the chain over time and the tensioner curves further inward, which maintains the chain under tension.

As mentioned above, when the tensioner of the prior art is exposed to a certain number of cycles of contraction and release, the ends 5a of the flat springs form a groove 4d in the wall of the pocket 4a (and analogously in the pocket 3a of head 3, not shown specifically). This groove hampers the subsequent effective functioning of the tensioner.

Figure 5:
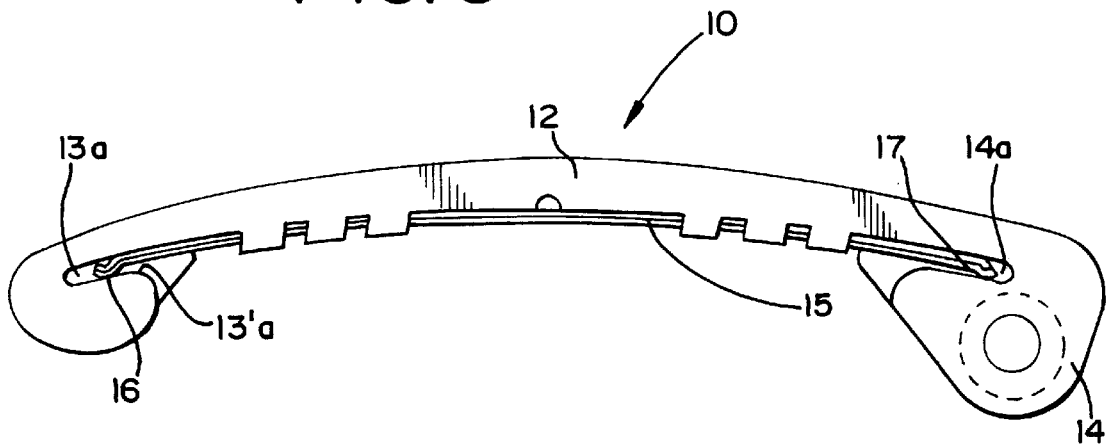
FIG. 5 illustrates a tensioner according to the invention in which the ends of the blade springs are curved.
Figure 3:
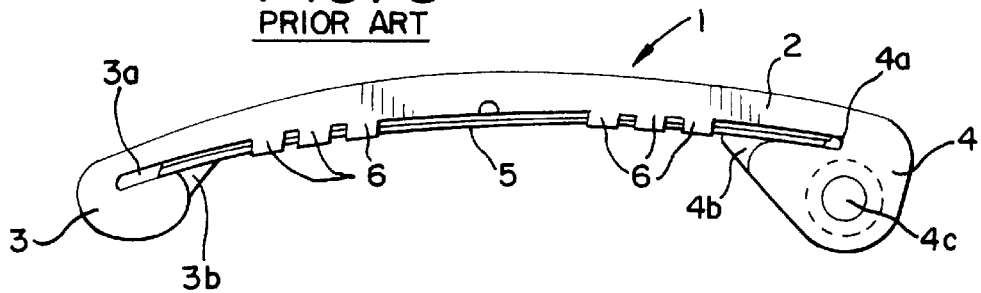
FIG. 3 is a side elevation view of a chain tensioner of the prior art showing a plurality of blade springs within the shoe.
Figure 4:
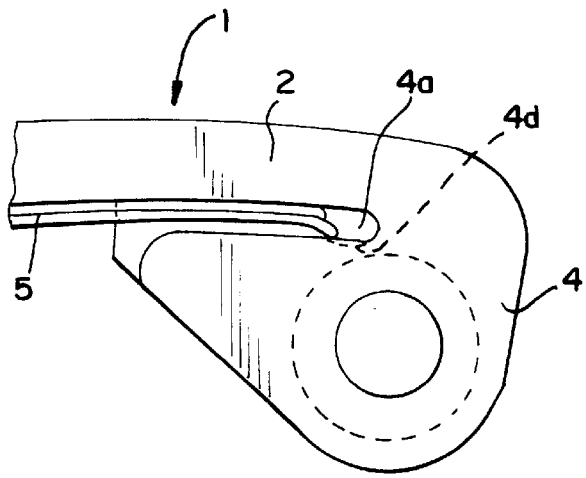
FIG. 4 is a portion of a chain tensioner of the prior art showing the ends of the blade springs.
Figure 2:
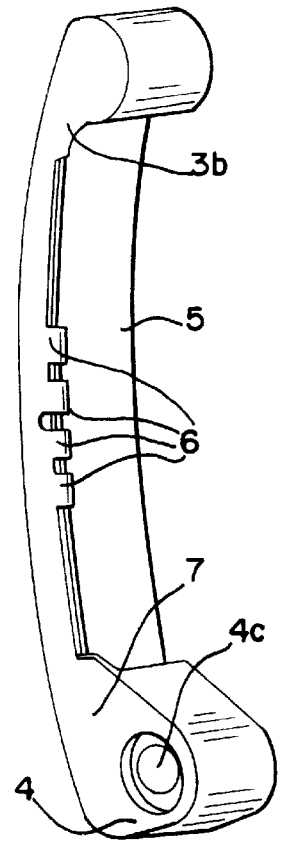
FIG. 2 is a perspective view of a chain tensioner of the prior art showing the blade spring and shoe.
Figure 6:
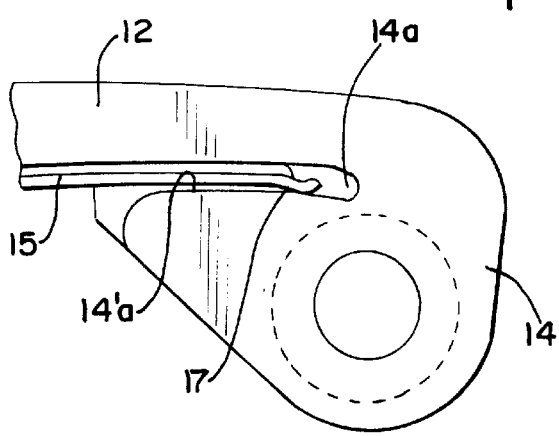
FIG. 6 illustrates a portion of a tensioner according to the invention in which the end of the lower spring blade of a pair of spring blades is curved.
Figure 7:
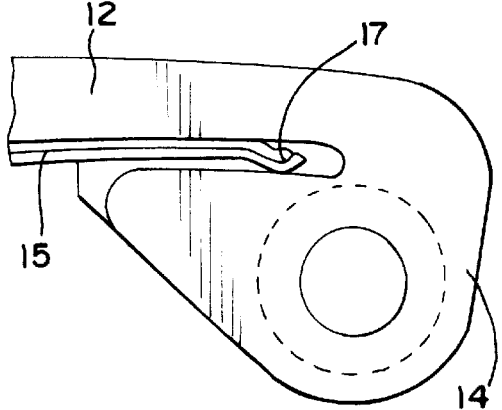
FIG. 7 illustrates a portion of another embodiment of the present invention in which the ends of both of a pair of spring blades are curved.

FIGS. 5, 6, and 7 show the chain tensioner according to the invention, which includes a body 12 made of plastic material subject to deformation and a flat spring, or a group of flat springs, 15. The body 12 has heads or knurls with expanded ends 13 and 14. Each end forms a pocket with the body of the shoe, 13a and 14a. According to the invention, the spring 15, or at least the spring most outward of a group of springs 15, is made with the ends 16, 17 rounded or curled or curved so as to present a convex surface in contact with the walls, respectively, 13'a, 14'a of the pocket 13a and 14a. The convex surface is in the shape of a crest or the like formed across the width of the flat spring blade from side-to-side or, in other words, perpendicular to the longitudinal axis of the flat spring blade or perpendicular to the direction of movement of the chain. The convex surface is formed outward toward the inner surface of the pocket in a vertical direction with respect to the longitudinal axis of the blade surface. Preferably, as in FIG. 6, more than one spring of the group 15, preferably all the springs, are made with the end curved in a similar manner.

A preferred curvature radius for the end of the springs is about 2 mm when the width of the pocket is 2 mm. Larger radii are preferable when additional space permits.

In this manner, the end of the spring is permitted to slide more easily over the surface 14'a or 13'a, without forming a groove in the surface, and therefore without becoming wedged into the shoe. This structure facilitates a longer working life of the tensioner.

Those skilled in the art to which the invention pertains may make modifications and other embodiments employing the principles of this invention without departing from its spirit or essential characteristics, particularly upon the foregoing teachings.

What is claimed is:

1. A chain tensioner comprising:

a shoe made of plastic material subject to elastic deformation as a chain travels over an upper surface of said shoe, said shoe being formed with a central body and lateral ends, said shoe including a containment wall between said lateral ends, each of said lateral ends of said shoe having pockets formed therein, each of said pockets having an inner surface and facing openings on a lower surface of said shoe;

first and second flat spring blades, each said spring blade having a surface with two sides and two ends, said spring blade ends contained in said pockets in said lateral ends of said shoe on said lower surface of said shoe, said first flat spring blade having said blade surface engaging said shoe on said lower surface of said shoe and imparting a tension on the shoe tending to deform said lateral ends of said shoe inward toward one another, at least one of said sides of at least one of said flat spring blades being in contact with said containment wall of said shoe, at least one of said ends of said first flat spring blade being rounded to present a convex surface in contact with said inner surface of at least one of said pockets, said convex surface of said flat spring blade being formed across the width of said flat spring blade with said convex surface extending outward toward said inner surface of said pockets in a vertical direction.

2. The chain tensioner of claim 1, wherein said first flat spring blade has both ends rounded with convex curves, each of said blade ends presenting a convex surface in contact with said inner surfaces in each of respective said pockets.

3. The chain tensioner of claim 1, wherein each of said first and second flat spring blades has convex curved ends.

4. The chain tensioner of claim 3 wherein each of said first and second flat spring blades has convex curved ends at both ends of said flat spring blades.

* * * * *